(12) United States Patent
Chen et al.

(10) Patent No.: US 8,723,895 B2
(45) Date of Patent: May 13, 2014

(54) DISPLAY AND REAL-TIME AUTOMATIC WHITE BALANCE METHOD THEREOF

(75) Inventors: Chin-Jung Chen, Tainan County (TW); Chia-Cheng Lai, Tainan County (TW); Yuet-Wing Li, Tainan County (TW); Ming-Cheng Chiu, Tainan County (TW)

(73) Assignee: Himax Display, Inc., Tainan (TW)

( * ) Notice: Subject to any disclaimer, the term of this patent is extended or adjusted under 35 U.S.C. 154(b) by 765 days.

(21) Appl. No.: 12/948,071

(22) Filed: Nov. 17, 2010

(65) Prior Publication Data

US 2011/0316890 A1 Dec. 29, 2011

Related U.S. Application Data

(60) Provisional application No. 61/358,409, filed on Jun. 24, 2010.

(51) Int. Cl.
*G09G 5/10* (2006.01)

(52) U.S. Cl.
USPC .................. 345/690; 345/76; 345/77; 345/83

(58) Field of Classification Search
USPC ......... 345/102, 207, 77, 83, 88; 348/687, 655
See application file for complete search history.

(56) References Cited

U.S. PATENT DOCUMENTS

| 8,362,707 | B2 * | 1/2013 | Draper et al. | 315/291 |
|---|---|---|---|---|
| 2010/0079364 | A1 * | 4/2010 | Feng | 345/102 |
| 2010/0079365 | A1 | 4/2010 | Feng et al. | |
| 2010/0149420 | A1 | 6/2010 | Zhang et al. | |

FOREIGN PATENT DOCUMENTS

| CN | 1831635 | 9/2006 |
|---|---|---|
| CN | 1832581 | 9/2006 |
| CN | 101283394 | 10/2008 |
| TW | 200823860 | 6/2008 |
| TW | 200917854 | 4/2009 |

OTHER PUBLICATIONS

"First Office Action of China counterpart application" issued on Jun. 21, 2013, p. 1-p. 10, in which the listed references (Ref. 3-6) were cited.
"Office Action of Taiwan counterpart application" issued on Jul. 23, 2013, p. 1-p. 7, in which the listed references (Ref. 1-2 and 4-7) were cited.

\* cited by examiner

*Primary Examiner* — Alexander Eisen
*Assistant Examiner* — Robin Mishler
(74) *Attorney, Agent, or Firm* — J.C. Patents (57) ABSTRACT

A display and a real-time automatic white balance method thereof are provided. The display includes a first color light source and a second color light source. The real-time automatic white balance method includes following steps. A first target luminance of the first color light source and a second target luminance of the second color light source are provided. A luminance of the first color light source is detected to obtain a first current luminance. A second current luminance of the second color light source is calculated according to a ratio of the first target luminance to the first current luminance and the second target luminance. A luminance of the second color light source is adjusted according to the second current luminance.

12 Claims, 4 Drawing Sheets

DISPLAY AND REAL-TIME AUTOMATIC WHITE BALANCE METHOD THEREOF

CROSS-REFERENCE TO RELATED APPLICATION

This application claims the priority benefit of U.S. provisional application Ser. No. 61/358,409, filed on Jun. 24, 2010. The entirety of the above-mentioned patent application is hereby incorporated by reference herein and made a part of specification.

BACKGROUND OF THE INVENTION

1. Field of the Invention

The present invention generally relates to a display, and more particularly, to a real-time automatic white balance method of a display.

2. Description of Related Art

In recent years, red, green, and blue light emitting diodes (LEDs) are mostly adopted as the light sources of displays (for example, projection displays) in order to achieve a high color rendering index (CRI) and a high color diversity. Because three different colors of LEDs are adopted, a greater color variability is achieved compared to that by a single color of LEDs. Thereby, the colors of the red, green, and blue LEDs should be calibrated. Namely, the red, green, and blue LEDs should be white balanced. In particular, because the wavelength and brightness of a LED change along with the temperature, a feedback system is required for automatically compensating the white balance of the LED in real time.

SUMMARY OF THE INVENTION

Accordingly, the present invention is directed to a display and a real-time automatic white balance method thereof, wherein the white balance of the display is automatically compensated in real time during the normal operation of the display.

The present invention provides a real-time automatic white balance method of a display. The display includes a first color light source and a second color light source. The real-time automatic white balance method includes following steps. A first target luminance of the first color light source and a second target luminance of the second color light source are provided. The luminance of the first color light source is detected to obtain a first current luminance. A second current luminance of the second color light source is calculated according to the second target luminance and the ratio of the first target luminance to the first current luminance. The luminance of the second color light source is adjusted according to the second current luminance.

The present invention provides a display includes a first color light source, a second color light source, a photo sensor, and a control and driving module. The photo sensor detects the luminance of the first color light source to obtain a first current luminance. The control and driving module is coupled to the photo sensor, the first color light source, and the second color light source. The control and driving module has a first target luminance of the first color light source and a second target luminance of the second color light source. The control and driving module calculates a second current luminance of the second color light source according to the second target luminance and the ratio of the first target luminance to the first current luminance. After that, the control and driving module adjusts the luminance of the second color light source according to the second current luminance.

According to an embodiment of the present invention, the control and driving module calculates the second current luminance=the second target luminance×the first current luminance÷the first target luminance.

According to another embodiment of the present invention, the display further includes a thermal sensor coupled to the control and driving module. The thermal sensor detects a temperature T inside the display. The control and driving module calculates the second current luminance=a temperature function×the second target luminance×the first current luminance÷the first target luminance according to the temperature T.

According to an embodiment of the present invention, the temperature function is a×T+b, wherein T is the temperature, and a and b are real numbers.

As described above, in an embodiment of the present invention, the white balance of a display is automatically compensated in real time during the normal operation of the display. In some embodiments, in order to compensate for the wavelength shift of LEDs caused by the increasing temperature, a temperature function with a temperature argument is brought into the equation for compensating for the white balance.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

A display provided by the present invention may be any display with different colors of light sources, such as a transmissive display with a backlight source or a reflective display (for example, a micro projector). Below, a micro projector with different colors of light sources will be described as an example.

Figure 1:
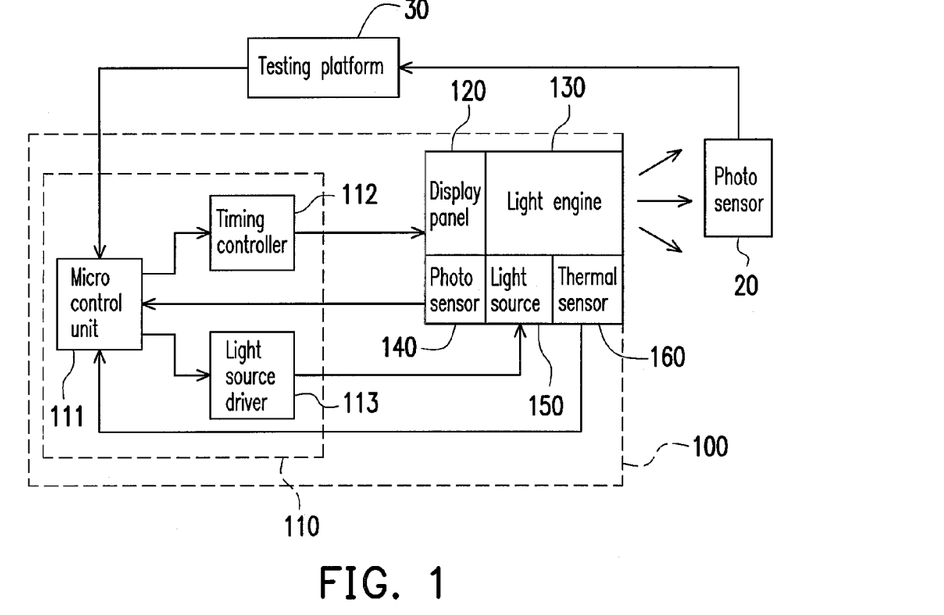
FIG. 1 is a diagram illustrating the functional modules of a micro projector according to an embodiment of the present invention.

FIG. 1 is a diagram illustrating the functional modules of a micro projector 100 according to an embodiment of the present invention. The micro projector 100 includes a control and driving module 110, a display panel 120, a light engine 130, a photo sensor 140, a light source 150, and a thermal sensor 160. The light source 150 may be any type of light emitting device, such as a light emitting diode (LED). The light source 150 has a plurality of color light sources. In some embodiments, the light source 150 may have a blue light source and a yellow light source, such as a blue LED and a yellow LED. In the present embodiment, the light source 150 has a blue light source, a green light source, and a red light source, such as a blue LED, a green LED, and a red LED.

The control and driving module 110 includes a micro control unit (MCU) 111, a timing controller 112, and a light source driver 113. The timing controller 112 is connected between the MCU 111 and the display panel 120. The MCU 111 controls the display panel 120 to display images through the timing controller 112. The light source driver 113 is connected between the MCU 111 and the light source 150. The MCU 111 controls the light source 150 to provide different colors of light beams through the light source driver 113. The light engine 130 guides the color beams provided by the light source 150 to the display panel 120, and then the display panel 120 reflects the color beams back to the light engine 130. The light engine 130 projects the color beams reflected by the display panel 120 to outside of the micro projector 100.

After the micro projector 100 is manufactured, the manufacturer uses an external testing platform 30 and an external photo sensor 20 (for example, a CL-200 incident color meter) to detect the luminance of each color beam of the micro projector 100 (i.e., the luminance of each color light source in the light source 150), so as to perform a white balance calibration procedure on the micro projector 100. The testing platform 30 performs the white balance calibration procedure with respect to different temperature conditions to obtain different target luminance values. For example, when the temperature is 30° C., in the white balance calibration procedure, the MCU 111 first secures the current of the red LED in the light source 150 and respectively adjusts the currents of the blue LED and the green LED until a white balance is achieved. Herein the testing platform 30 records the luminance of the blue LED and the luminance of the green LED when the white balance is achieved with a temperature of 30° C. Next, the testing platform 30 performs the white balance calibration procedure again under another temperature (for example, 40° C.) to obtain another set of luminance values of the blue LED and the green LED. Following table 1 is a white balance lookup table, wherein the luminance values of different color light sources measured by the testing platform 30 when a white balance is achieved by the micro projector 100 under different temperatures are listed.

TABLE 1

White Balance Lookup Table

| LED Temperature | Luminance at White Balance | | |
|---|---|---|---|
| T | Red LED | Green LED | Blue LED |
| 30° C. | * | 1600 | 2090 |
| 40° C. | * | 1600 | 2050 |
| 50° C. | * | 1550 | 2000 |
| 60° C. | * | 1500 | 1900 |
| 70° C. | * | 1400 | 1800 |

The testing platform 30 stores the white balance lookup table into the MCU 111. After the white balance calibration procedure is performed, the external testing platform 30 and photo sensor 20 are removed. During the normal operation of the micro projector 100, automatic real-time white balance is realized in the micro projector 100 by using the internal photo sensor 140, the thermal sensor 160, and the white balance lookup table stored in the MCU 111. For example, the MCU 111 detects the temperature T of the light source 150 through the thermal sensor 160 and obtains the target luminance of the green LED and the blue LED corresponding to the temperature T from the white balance lookup table through interpolation. After that, the MCU 111 keeps the current of the red LED unchanged and adjusts the currents of the green LED and the blue LED until the current luminance of the green LED and the blue LED conforms to the target luminance obtained from the white balance lookup table.

In the real-time automatic white balance method of the micro projector 100 described in foregoing embodiment, automatic real-time compensation can be realized (accordingly the white balance of the micro projector 100 can be maintained) along with the variation of the temperature T of the light source 150 during the normal operation of the micro projector 100. However, when the LEDs age, the luminous intensities thereof decrease so that the white balance lookup table stored in the MCU 111 after the micro projector 100 is just manufactured is not applicable anymore. For example, the luminous intensities of the red LED, the green LED, and the blue LED all decrease along with the aging of these LEDs. If the real-time automatic white balance method described above is adopted, the MCU 111 increase the currents of the green LED and the blue LED and keeps the current of the red LED unchanged to satisfy the white balance lookup table. However, since the luminance of the red LED may also decrease due to the aging of the red LED, the images projected by the display 100 tend to be cyan color in the case that the current of the red LED is kept unchanged while the currents of the green LED and the blue LED are increased.

Figure 2:
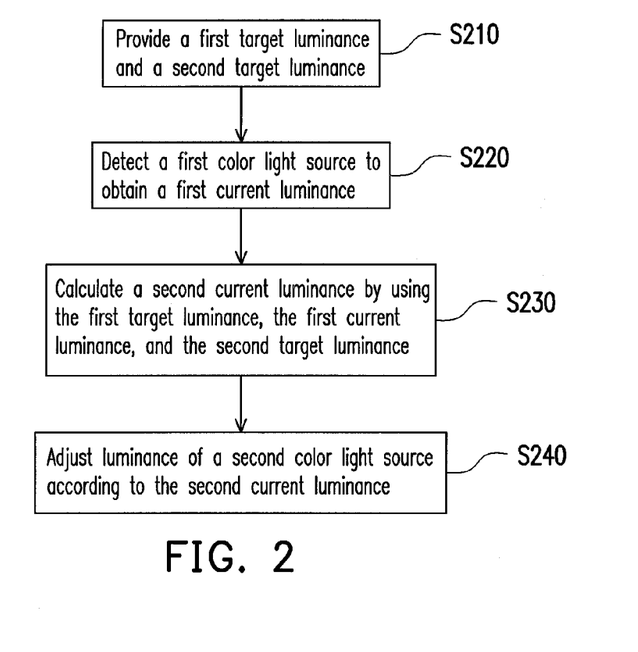
FIG. 2 is a flowchart of a real-time automatic white balance method of a display according to an embodiment of the present invention.

Another real-time automatic white balance method of the display 100 will be described herein with reference to another embodiment. FIG. 2 is a flowchart of the real-time automatic white balance method of the display 100 according to an embodiment of the present invention. The implementation details of the present embodiment can be referred to related description of foregoing embodiment. Similarly, in the present embodiment, a white balance calibration procedure is performed on the micro projector 100 by using an external testing platform 30 and an external photo sensor 20 right after the micro projector 100 is manufactured. The difference between the two embodiments is that in the present embodiment, the white balance calibration procedure is not repeatedly performed with different temperatures. In the present embodiment, the white balance calibration procedure is performed only once and only one set of target luminance values to achieve the white balance is obtained regardless of the temperature. For example, under the normal operation temperature of the light source 150, the testing platform 30 controls the MCU 111 to perform the white balance calibration procedure once to achieve the white balance and obtain a set of target luminance values Lux1' and Lux2' of the light source 150 by the external photo sensor 20.

The testing platform 30 records the target luminance values in a memory of the display 100 (for example, a flash memory in the MCU 111). After that, the external testing platform 30 and photo sensor 20 are removed. During the regular operation of the micro projector 100, the micro projector 100 achieves real-time automatic white balance by using the internal photo sensor 140 and the target luminance values stored in the MCU 111.

In the present embodiment, it is assumed that the light source 150 has a first color light source and a second color light source, such as a blue and a yellow light emitting device or a red and a cyan light emitting device. Referring to FIG. 1 and FIG. 2, in step S210, the MCU 111 of the control and driving module 110 provides a first target luminance Lux1' of the first color light source and a second target luminance Lux2' of the second color light source. Then, in step S220, the photo sensor 140 detects the luminance of the first color light source in the light source 150 so that the control and driving module 110 can obtain a first current luminance Lux1 of the first color light source.

The real-time automatic white balance method in the present embodiment can be expressed with following equation (1). In following equation (1), Lux2 is a second current luminance of the second color light source. In step S230, the MCU 111 of the control and driving module 110 calculates a ratio of the first target luminance Lux1' to the first current luminance Lux1 (i.e., Lux1/Lux1'). Thereafter, the MCU 111 calculates the second current luminance Lux2 according to the ratio Lux1/Lux1' and the second target luminance Lux2'. The second current luminance Lux2 may be obtained through following equation (2).

$$Lux1/Lux1'=Lux2/Lux2' \quad \text{Equation (1)}$$

$$Lux2=(Lux1/Lux1')\times Lux2' \quad \text{Equation (2)}$$

Next, in step S240, the MCU 111 of the control and driving module 110 adjusts the luminance of the second color light source according to the second current luminance Lux2 through the light source driver 113. Herein the luminance of the second color light source may be adjusted by adjusting the current and/or voltage of the second color light source or by adjusting the duty cycle of the second color light source.

Figure 3:
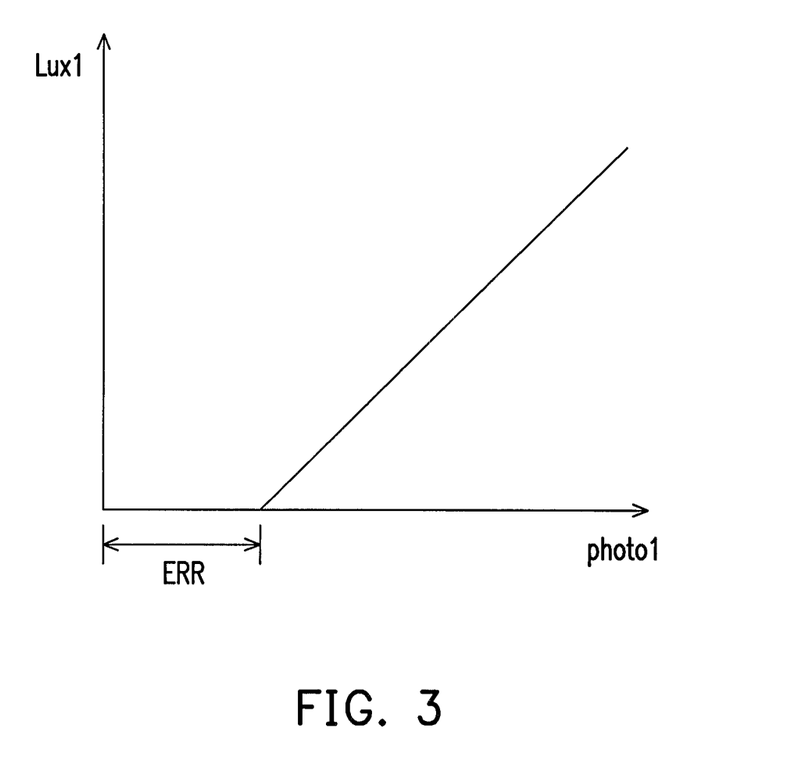
FIG. 3 is a diagram illustrating the relation between the luminance obtained by the MCU 111 and the actual luminance of the light source 150 according to an embodiment of the present invention.

In an actual application, a difference may exist between the luminance obtained by the MCU 111 (referred to as detected luminance thereinafter) and the actual luminance of the light source. For example, FIG. 3 is a diagram illustrating the relation between the luminance obtained by the MCU 111 and the actual luminance of the light source 150 according to an embodiment of the present invention. If the control and driving module 110 obtains the detected luminance photo1 of the first color light source in the light source 150 through the photo sensor 140, the actual luminance Lux1 of the first color light source is in direct ratio to (photo1−ERR), wherein ERR is an offset value between the luminance obtained by the control and driving module 110 and the actual luminance of the light source 150. If the luminance obtained by the control and driving module 110 exist the offset value ERR, the offset value ERR must be canceled.

Thus, foregoing embodiment can be revised. For example, the first target luminance and the second target luminance previously stored in the control and driving module 110 are respectively the revised values of the detected luminance photo1' and photo2'. For example, the first target luminance PH1'=photo1'−ERR, and the second target luminance PH2'=photo2'−ERR. The real-time automatic white balance method in the present embodiment can be expressed with following equation (3). In following equation (3), PH1 is the first current luminance of the first color light source, and PH2 is the second current luminance of the second color light source.

$$PH1/PH1'=PH2/PH2' \quad \text{Equation (3)}$$

In step S210, the MCU 111 of the control and driving module 110 provides the first target luminance PH1' of the first color light source and the second target luminance PH2' of the second color light source. Then, in step S220, the photo sensor 140 detects the luminance of the first color light source in the light source 150 so that the control and driving module 110 can obtain the detected luminance photo1 of the first color light source. However, the control and driving module 110 can revise the detected luminance photo1 (i.e., calculate PH1=photo1−ERR) to obtain the first current luminance PH1.

In step S230, the MCU 111 of the control and driving module 110 calculates a ratio of the first target luminance PH1' to the first current luminance PH1 (i.e., PH1/PH1'). Thereafter, the MCU 111 calculates the second current luminance PH2 of the second color light source according to the ratio PH1/PH1' and the second target luminance PH2'. For example, the following equation (4) is solved to obtain the second current luminance PH2.

$$PH2=(PH1/PH1')\times PH2' \quad \text{Equation (4)}$$

The implementation details of foregoing embodiments can be modified according to the actual design requirement by those applying the present invention. For example, in following embodiment, the decay in the luminous intensities of the LEDs and the shift in the wavelength of the lights emitted by the LEDs caused by increase in the temperature T will be taken into consideration.

In the present embodiment, a thermal sensor 160 is disposed around the light source 150. The thermal sensor 160 is coupled to the control and driving module 110, and which detects the temperature inside the display 100, especially the temperature T of the light source 150. The implementation details of the present embodiment can be referred to related descriptions of foregoing embodiments. In order to offset the affection of wavelength shift, in the present embodiment, foregoing equation (4) is revised into following equation (5), wherein a temperature function K(T) with the temperature T as its argument is brought in. The temperature function K(T) may be a linear equation, a quadratic equation, or other types of equation. For example, following equation (6) is an example of the temperature function K(T), wherein T is the temperature of the light source 150, and a and b are real numbers. The coefficient a and the constant b are determined according to the actual design requirement. Thus, the second current luminance PH2 of the second color light source adaptively changes along with the variation of the temperature T, and the white balance is automatically maintained in real time along with the variation of the first current luminance PH1 of the first color light source.

$$PH2=(PH1/PH1')\times PH2'\times K(T) \quad \text{Equation (5)}$$

$$K(T)=a\times T+b \quad \text{Equation (6)}$$

Thereafter, in step S240, the MCU 111 of the control and driving module 110 adjusts the luminance of the second color light source in the light source 150 according to the second current luminance PH2 through the light source driver 113.

Figure 4:
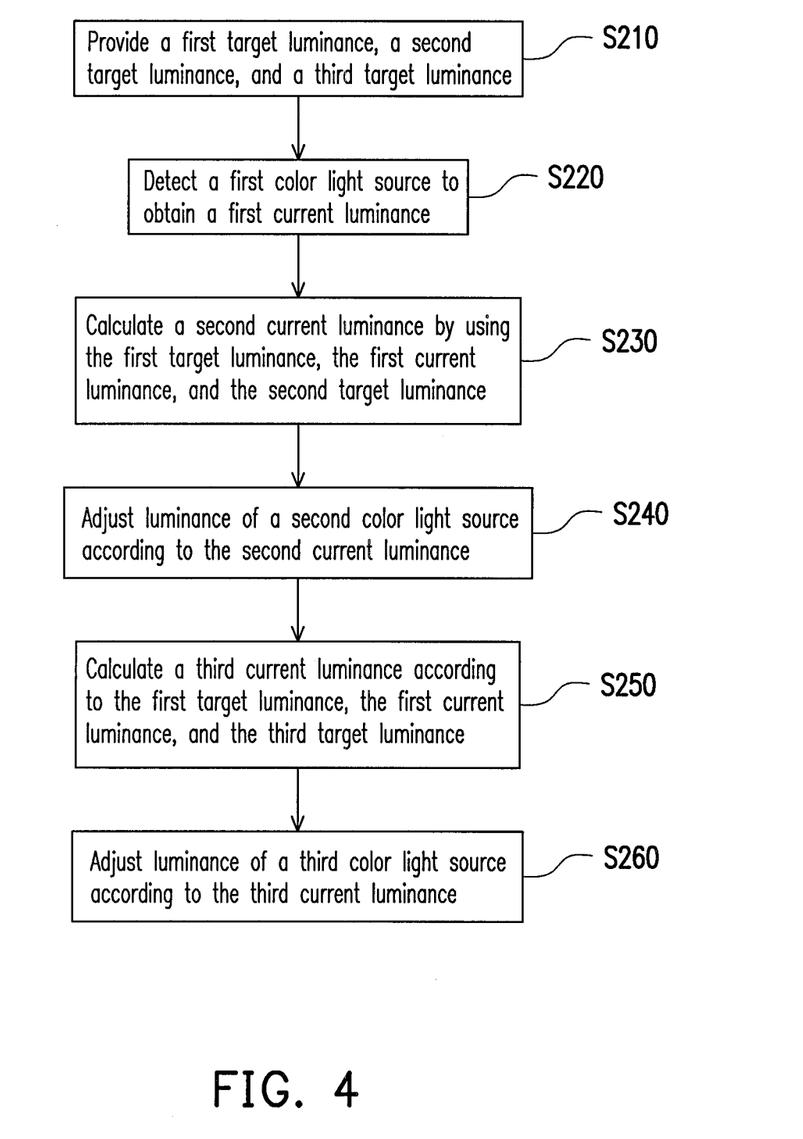
FIG. 4 is a flowchart of a real-time automatic white balance method of a display according to another embodiment of the present invention.

In the embodiments described above, it is assumed that the light source 150 has two color light sources. However, the present invention is not limited thereto. Those having ordinary knowledge in the art can implement the present invention in a display having three or more color light sources based on the descriptions of foregoing embodiments. FIG. 4 is a flowchart of a real-time automatic white balance method of a display 100 according to another embodiment of the present invention.

Referring to FIG. 1 and FIG. 4, in the present embodiment, the light source 150 has three color light sources. The three color light sources are respectively a first color light source, a second color light source, and a third color light source, such as a red LED, a green LED, and a blue LED. The implementation details of the present embodiment can be referred to related descriptions of foregoing embodiments. The steps S210-S240 in FIG. 4 are similar to the steps S210-S240 in FIG. 2 therefore will not be described herein. Similarly, in the present embodiment, a white balance calibration procedure is performed on the micro projector 100 by using an external testing platform 30 and an external photo sensor 20 right after the micro projector 100 is manufactured. The difference between the two embodiments is that in the present embodiment, a set of target luminance values of the first color light source, the second color light source, and the third color light source is achieved under white balance in the white balance calibration procedure. For example, under the normal operation temperature of the light source 150, the testing platform 30 controls the MCU 111 to perform the white balance calibration procedure once, so as to obtain the target luminance Lux_R', Lux_G', and Lux_B' of the first color light source, the second color light source, and the third color light source under the white balance. The testing platform 30 records the target luminance Lux_R', Lux_G', and Lux_B' in the memory of the display 100 (for example, a flash memory in the MCU 111). After that, the external testing platform 30 and photo sensor 20 are removed.

Thus, in step S210 illustrated in FIG. 4, the MCU 111 of the control and driving module 110 can provide the first target luminance Lux_R' of the first color light source, the second target luminance Lux_G' of the second color light source, and the third target luminance Lux_B' of the third color light source. Next, in step S220, the photo sensor 140 detects the luminance of the first color light source in the light source 150 so that the control and driving module 110 can obtain the first current luminance Lux_R of the first color light source.

The real-time automatic white balance method in the present embodiment can be expressed with following equation (7). In following equation (7), Lux_G is the second current luminance of the second color light source, and Lux_B is the third current luminance of the third color light source. In step S230, the MCU 111 of the control and driving module 110 calculates the ratio of the first target luminance Lux_R' to the first current luminance Lux_R (i.e., Lux_R/Lux_R'). Next, the MCU 111 calculates the second current luminance Lux_G according to the ratio Lux_R/Lux_R' and the second target luminance Lux_G'. For example, following equation (8) is solved to obtain the second current luminance Lux_G.

$$Lux\_R/Lux\_R'=Lux\_G/Lux\_G'=Lux\_B/Lux\_B' \quad \text{Equation (7)}$$

$$Lux\_G=(Lux\_R/Lux\_R')\times Lux\_G' \quad \text{Equation (8)}$$

After that, in step S240, the MCU 111 of the control and driving module 110 adjusts the luminance of the second color light source according to the second current luminance Lux_G through the light source driver 113.

Thereafter, in step S250, the MCU 111 of the control and driving module 110 calculates the third current luminance Lux_B according to the ratio Lux_R/Lux_R' and the third target luminance Lux_B'. For example, following equation (9) is solved to obtain the third current luminance Lux_B.

$$Lux\_B=(Lux\_R/Lux\_R')\times Lux\_B' \quad \text{Equation (9)}$$

Thereafter, in step S260, the MCU 111 of the control and driving module 110 adjusts the luminance of the third color light source according to the third current luminance Lux_B through the light source driver 113.

If the luminance obtained by the control and driving module 110 exist the offset value ERR, the offset value ERR must be canceled. In an actual application, if the control and driving module 110 obtains the detected luminance photo_R of the first color light source in the light source 150 through the photo sensor 140, the actual luminance Lux_R of the first color light source is in direct ratio to (photo_R−ERR). The same applies to the detected luminance photo_G of the second color light source and the detected luminance photo_B of the third color light source. Accordingly, the embodiment described above can be revised. For example, the first target luminance, the second target luminance, and the third target luminance previously stored in the control and driving module 110 are respectively the revised values of the detected luminance photo_R', photo_G', and photo_B' of the red, green, and blue light sources. For example, the first target luminance PH_R'=photo_R'−ERR, the second target luminance PH_G'=photo_G'−ERR, and the third target luminance PH_B'=photo_B'−ERR. The real-time automatic white balance method in the present embodiment can be expressed with following equation (10). In following equation (10), PH_R is the first current luminance of the first color light source, PH_G is the second current luminance of the second color light source, and PH_B is the third current luminance of the third color light source.

$$PH\_R/PH\_R'=PH\_G/PH\_G'=PH\_B/PH\_B' \quad \text{Equation (10)}$$

In step S210 illustrated in FIG. 4, the MCU 111 of the control and driving module 110 provides the first target luminance PH_R', the second target luminance PH_G', and the third target luminance PH_B'. Then, in step S220, the photo sensor 140 detects the luminance of the first color light source in the light source 150 so that the control and driving module 110 can obtain the detected luminance photo_R of the first color light source. However, the control and driving module 110 can revise the detected luminance photo_R (i.e., calculate PH_R=photo_R−ERR) to obtain the first current luminance PH_R.

In step S230, the MCU 111 of the control and driving module 110 calculates the ratio of the first target luminance PH_R' to the first current luminance PH_R (i.e., PH_R/PH_R'). Next, the MCU 111 calculates the second current luminance PH_G of the second color light source according to the ratio PH_R/PH_R' and the second target luminance PH_G'. For example, following equation (11) is solved to obtain the second current luminance PH_G.

$$PH\_G=(PH\_R/PH\_R')\times PH\_G' \quad \text{Equation (11)}$$

Additionally, in step S250, the MCU 111 of the control and driving module 110 calculates the third current luminance PH_B of the third color light source according to the ratio PH_R/PH_R' and the third target luminance PH_B'. For example, following equation (12) is solved to obtain the third current luminance PH_B.

$$PH\_B=(PH\_R/PH\_R')\times PH\_B' \quad \text{Equation (12)}$$

The implementation details of foregoing embodiment can be modified according to the actual design requirement by those applying the present invention. For example, in following embodiment, the decay in the luminous intensities of the LEDs and the shift in the wavelength of the lights emitted by the LEDs caused by increase in the temperature T will be taken into consideration.

Figure 5:
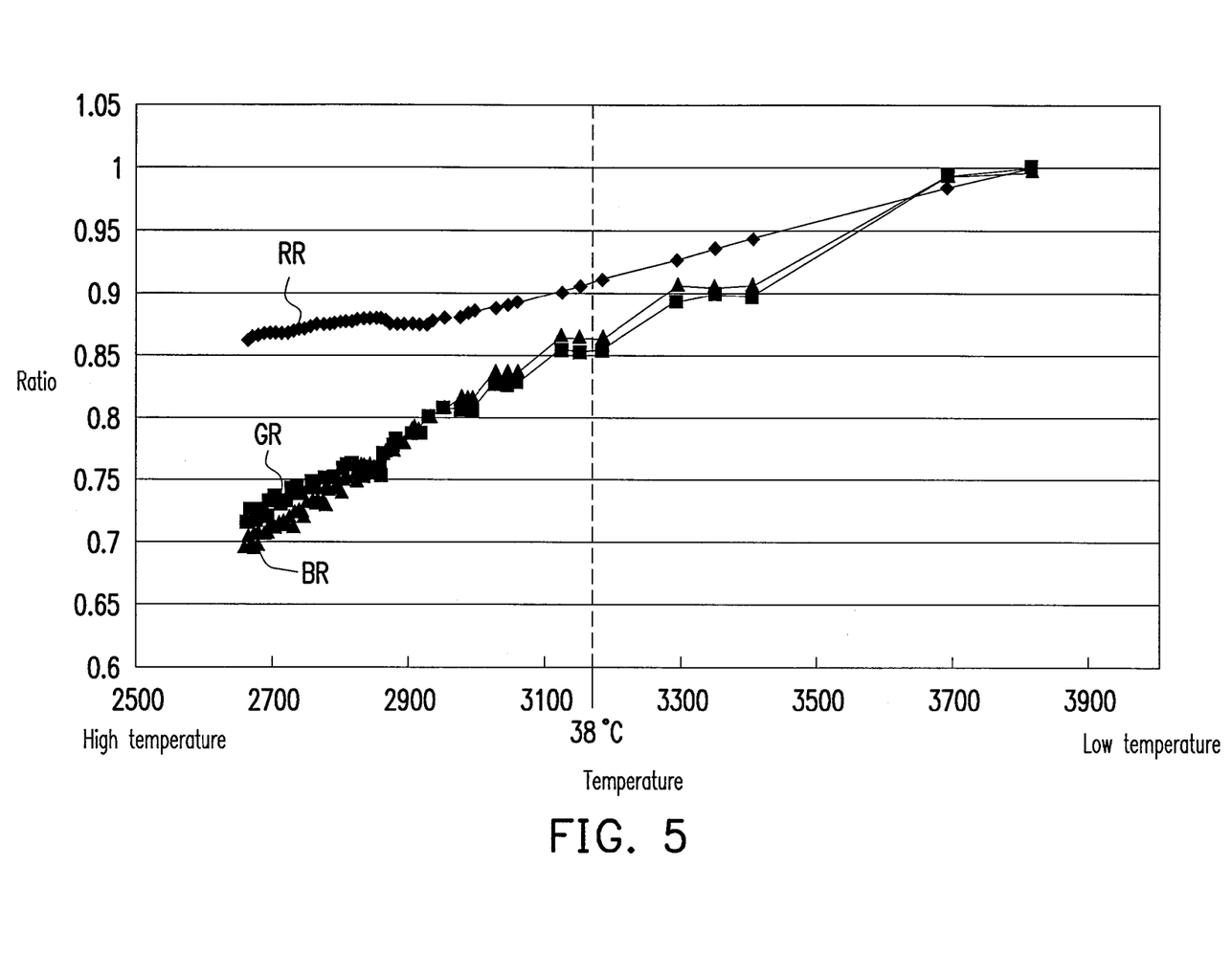
FIG. 5 illustrates the relation curves between the rates of a red LED, a green LED, and a blue LED versus the temperature.

In the present embodiment, a thermal sensor 160 is disposed around the light source 150. The implementation details of the present embodiment can be referred to related descriptions of forgoing embodiments. In some embodiments, along with the increase of the temperature T, the intensity decay of the red LED is greater than that of the green LED and the blue LED. FIG. 5 illustrates the relation curves between the rates of the red LED, the green LED, and the blue LED and the temperature. The characteristic curves RR, GR, and BR respectively indicate the rates of the red LED, the green LED, and the blue LED under different temperature T. The ordinate represents the ratio of the current luminance to the target luminance of a color light source. For example, the rate RR of the red light source is PH_R/PH_R', the rate GR of the green light source is PH_G/PH_G', and the rate BR of the blue light source is PH_B/PH_B'. The abscissa represents the temperature T. Generally speaking, the analog value output by the thermal sensor 160 is converted by an analog-to-digital converter (ADC) to obtain the digital value of the temperature T. For example, in FIG. 5, the digital value 3150 of the temperature T is equivalent to 38° C.

Below the luminous intensity decay of the red LED is greater than that of the green LED and the blue LED along with the increase of the temperature T, the currents of the green LED and the blue LED needs to be reduced to a greater extent at a higher temperature than that at a lower temperature. In order to offset the affection of the wavelength shift, in the present embodiment, foregoing equation (11) is revised into following equation (13), and foregoing equation (12) is revised into following equation (14). A temperature function $K1(T)$ and a temperature function $K2(T)$ that have the temperature T as their argument are respectively brought into the equation (13) and the equation (14) so as to adjust the compensation rate along with the variation of the temperature. For example, the equation (15) is an example of the temperature function $K1(T)$ and the temperature function $K2(T)$. The coefficient a and the constant b are determined according to the actual design requirement.

$$PH\_G = (PH\_R/PH\_R') \times PH\_G' \times K1(T) \quad \text{Equation (13)}$$

$$PH\_B = (PH\_R/PH\_R') \times PH\_B' \times K2(T) \quad \text{Equation (14)}$$

$$K1(T) = K2(T) = a \times T + b \quad \text{Equation (15)}$$

Additionally, the temperature function $K1(T)$ and the temperature function $K2(T)$ can be derived from experiments. In foregoing example, because the LEDs show greater impact on the color coordinates along with the increase of the temperature, the temperature function $K1(T)$ and the temperature function $K2(T)$ may only be brought in when the temperature T is higher than 38° C., as expressed in following equation (16):

$$K1(T) = K2(T) = 0.00035T - 0.11988 \text{ if } T > 38°\text{ C.}$$

$$K1(T) = K2(T) = 1 \text{ if } T < 38°\text{ C.} \quad \text{Equation (16)}$$

The temperature T in foregoing equation (16) is a digital value converted by an ADC. Namely, if the digital value T is greater than 3150 (equivalent to the temperature smaller than 38° C.), the coefficient a in foregoing equation (15) is 0, and the constant b is 1, and if the digital value T is smaller than 3150 (equivalent to the temperature greater than 38° C.), the coefficient a is 0.00035, and the constant b is 0.11988. Thus, the second current luminance PH_G and the third current luminance PH_B are adaptively adjusted along with the variation of the temperature T, and meanwhile, the white balance is automatically maintained in real time along with the variation of the first current luminance PH_R.

In step S220 of foregoing embodiment, the luminance of the first color light source in the light source 150 is detected to obtain the first current luminance Lux_R (or PH_R). In step S220 of another embodiment, the luminance of another color light source may be detected. For example, in step S220, the luminance of the second color light source in the light source 150 is detected to obtain the second current luminance PH_G. In step S230, the first current luminance PH_R is calculated according to the ratio PH_G/PH_G' and the first target luminance PH_R'. In step S240, the luminance of the first color light source is adjusted according to the first current luminance PH_R. In step S250, the third current luminance PH_B is calculated according to the ratio PH_G/PH_G' and the third target luminance PH_B'. In step S260, the luminance of the third color light source is adjusted according to the third current luminance PH_B. Or, in step S220, the luminance of the third color light source in the light source 150 is detected to obtain the third current luminance PH_B. In step S230, the first current luminance PH_R is calculated according to the ratio PH_B/PH_B' and the first target luminance PH_R'. In step S240, the luminance of the first color light source is adjusted according to the first current luminance PH_R. In step S250, the second current luminance PH_G is calculated according to the ratio PH_B/PH_B' and the second target luminance PH_G'. In step S260, the luminance of the third color light source is adjusted according to the second current luminance PH_G.

In summary, in foregoing embodiments of the present invention, the white balance is automatically maintained in real time along with the variation of the first current luminance PH_R during the normal operation of the display. In some embodiments, in order to offset the affection of the increase in the temperature and the shift in the wavelengths of the LEDs, the temperature function with a temperature argument is brought into the equation of the white balance, so that the second current luminance PH_G and the third current luminance PH_B are adaptively adjusted along with the variation of the temperature T.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A real-time automatic white balance method of a display, wherein the display comprises a first color light source and a second color light source, the real-time automatic white balance method comprising:
    providing a first target luminance of the first color light source and a second target luminance of the second color light source;
    detecting a luminance of the first color light source to obtain a first current luminance;
    calculating a second current luminance of the second color light source according to the second target luminance and a ratio of the first target luminance to the first current luminance, wherein the second current luminance=a temperature function×the second target luminance×the first current luminance÷the first target luminance; and
    adjusting a luminance of the second color light source according to the second current luminance.

2. The real-time automatic white balance method according to claim 1 further comprising:
    performing a white balance calibration procedure on the display after the display is manufactured, so as to obtain the first target luminance and the second target luminance; and
    recording the first target luminance and the second target luminance into a memory of the display.

3. The real-time automatic white balance method according to claim 1, wherein the temperature function is a×T+b, T is a temperature, and a and b are real numbers.

4. A display, comprising:
    a thermal sensor, for detecting a temperature T inside the display;

a first color light source and a second color light source;

a photo sensor, for detecting a luminance of the first color light source to obtain a first current luminance; and a control and driving module, coupled to the thermal sensor, the photo sensor, the first color light source, and the second color light source, having a first target luminance of the first color light source and a second target luminance of the second color light source, calculating a second current luminance of the second color light source according to the second target luminance and a ratio of the first target luminance to the first current luminance, and adjusting a luminance of the second color light source according to the second current luminance, wherein the control and driving module calculates the second current luminance=a temperature function×the second target luminance×the first current luminance÷the first target luminance according to the temperature T.

5. The display according to claim 4, wherein the control and driving module comprises a memory for storing the first target luminance and the second target luminance.

6. The display according to claim 4, wherein the temperature function is a×T+b, a and b are real numbers.

7. A real-time automatic white balance method of a display, wherein the display comprises a first color light source, a second color light source, and a third color light source, and the real-time automatic white balance method comprising:

providing a first target luminance of the first color light source, a second target luminance of the second color light source, and a third target luminance of the third color light source;

detecting a luminance of the first color light source to obtain a first current luminance;

calculating a second current luminance of the second color light source according to the second target luminance and a ratio of the first target luminance to the first current luminance;

adjusting a luminance of the second color light source according to the second current luminance;

calculating a third current luminance of the third color light source according to the third target luminance and the ratio of the first target luminance to the first current luminance, wherein the third current luminance=a temperature function×the third target luminance×the first current luminance÷the first target luminance; and adjusting a luminance of the third color light source according to the third current luminance.

8. The real-time automatic white balance method according to claim 7, wherein the first color light source, the second color light source, and the third color light source are respectively a red light source, a green light source, and a blue light source.

9. The real-time automatic white balance method according to claim 7 further comprising:

performing a white balance calibration procedure on the display after the display is manufactured, so as to obtain the first target luminance, the second target luminance, and the third target luminance; and recording the first target luminance, the second target luminance, and the third target luminance into a memory of the display.

10. A display, comprising:

a thermal sensor, for detecting a temperature T inside the display;

a first color light source, a second color light source, and a third color light source;

a photo sensor, for detecting a luminance of the first color light source to obtain a first current luminance; and a control and driving module, coupled to the thermal sensor, the photo sensor, the first color light source, the second color light source and the third color light source, having a first target luminance of the first color light source, a second target luminance of the second color light source and the third target luminance of the third color light source, calculating a second current luminance of the second color light source according to the second target luminance and a ratio of the first target luminance to the first current luminance, and adjusting a luminance of the second color light source according to the second current luminance, calculating a third current luminance of the third color light source according to the third target luminance and the ratio of the first target luminance to the first current luminance, and adjusting a luminance of the third color light source according to the third current luminance, wherein the control and driving module calculates the third current luminance=a temperature function×the third target luminance×the first current luminance÷the first target luminance.

11. The display according to claim 10, wherein the first color light source, the second color light source, and the third color light source are respectively a red light source, a green light source, and a blue light source.

12. The display according to claim 10, wherein the control and driving module comprises a memory for storing the first target luminance, the second target luminance, and the third target luminance.

* * * * *